(No Model.)

R. WIEHLE, W. LOREY, Jr., & C. FEUCHTER.
RUNNING GEAR FOR VEHICLES.

No. 332,029.  Patented Dec. 8, 1885.

WITNESSES:

INVENTOR:
Robert Wiehle
Wm Lorey Junr
Christian Feuchter
BY Munn & Co.
ATTORNEYS.

UNITED STATES PATENT OFFICE.

ROBERT WIEHLE, WILLIAM LOREY, JR., AND CHRISTIAN FEUCHTER, OF IRONTON, OHIO.

RUNNING-GEAR FOR VEHICLES.

SPECIFICATION forming part of Letters Patent No. 332,029, dated December 8, 1885.

Application filed September 24, 1885. Serial No. 178,030. (No model.)

*To all whom it may concern:*

Be it known that we, ROBERT WIEHLE, WILLIAM LOREY, Jr., and CHRISTIAN FEUCHTER, of Ironton, in the county of Lawrence and State of Ohio, have invented a new and Improved Running-Gear for Vehicles, of which the following is a full, clear, and exact description.

Our invention relates to the running-gear of buggies, wagons, or other vehicles, and has for its object to stay the upper sections of the body-supporting springs to each other and to the wagon-bed and other parts of the running-gear, so as to prevent a permanent forward or backward pitching or set of the front and rear body-springs, and cause them to remain upright for more easy and effective action, and irrespective of the load on the vehicle, whereby the durability of the wagon-body and of the springs and the entire running-gear will be increased.

The invention consists in certain novel features of construction and combinations of parts of the running-gear, all as hereinafter fully described and claimed.

Reference is to be had to the accompanying drawings, forming a part of this specification, in which similar letters of reference indicate corresponding parts in both the figures.

Figure 1:
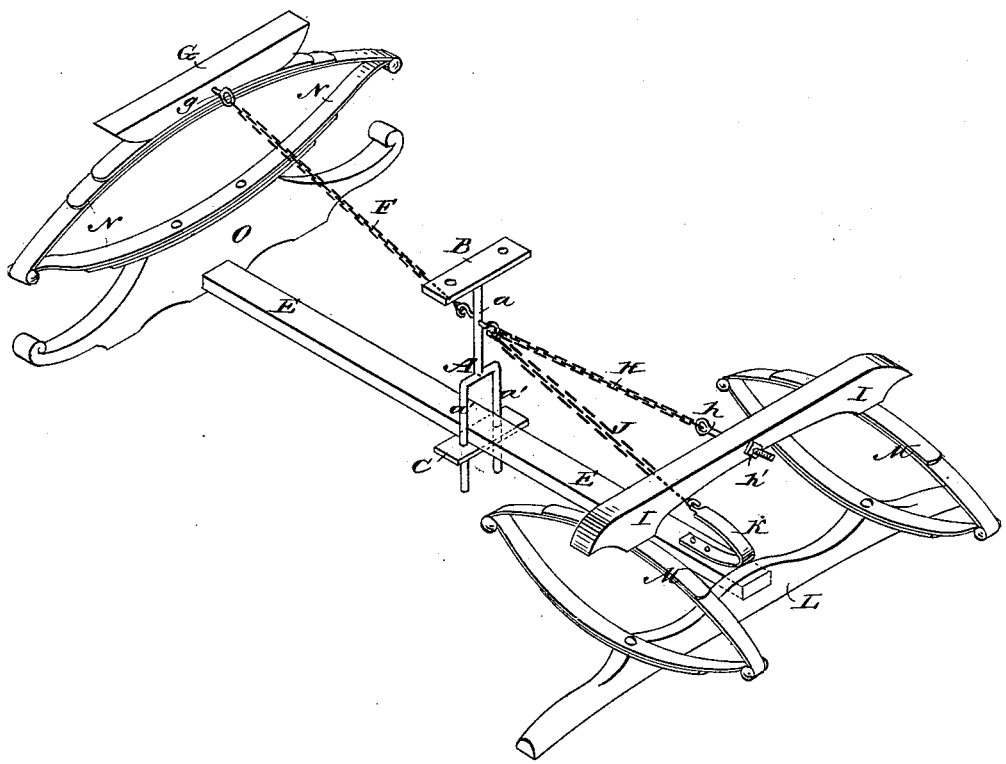
Figure 2:
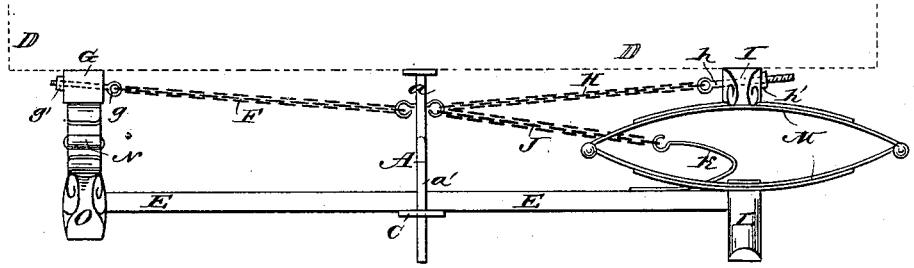

Figure 1 is a perspective view of the upper parts of a vehicle running-gear with our improvement applied, and Fig. 2 is a side elevation thereof with the vehicle bed or box indicated in dotted lines.

The letter A indicates a metal-rod guide or frame, which has an upper stem portion, $a$, and a lower portion preferably branching into two rods, $a'$ $a'$, in fork form. To the top of the stem $a$ is fixed a plate, B, which is to be made fast to the wagon-bed D, (dotted,) and the fork-rods $a'$ $a'$ are fitted to slide in a plate, C, fixed to the reach E of the running-gear, so that as the wagon-bed D falls or rises with a heavier or lighter load the guide A will fall or rise with the bed.

The letter F indicates a chain which is connected by a hook or otherwise with the stem $a$ of guide A, and at its forward end is connected to the forward bed-block, G, and preferably by means of a screw bolt and nut, as at $g$ $g'$.

At H is shown a chain which is connected by a hook or otherwise with the stem $a$ of guide A, and at its other end is connected to the rear bed-block, I, and preferably by a screw bolt and nut, as at $h$ $h'$. To the stem $a$ of guide A also is connected the forward end of a chain, J, the rear end of which is connected to the free end of a spring, K, which is fixed, preferably, to the reach E, but which may be fixed to the rear head-block, L, on which the rear springs, M M, are supported, the upper sides of said springs M M being braced to each other by the block I, to which the wagon-bed is fastened. The forward spring, N, is secured to the forward head-block, O, and the bed-block G—to which the chain F is fixed—is bolted to the upper half or section of the spring N, all as clearly shown in the drawings. It is evident that the chains F H, connected to the rod guide A, stay the bed-blocks G I to each other, and consequently hold the springs N M M at all times in proper relation with each other and with the wagon-bed, and as the guide A is free to rise and fall with the wagon-bed and the upper sections of the springs, the stay-chains F H always will have the same effect, however light or heavy the load in the wagon may be.

The stay-chain J and spring K act as follows: The tension of the spring K is sufficient to resist any ordinary strain thrown on the running-gear; but should the wagon-wheels run over an obstruction or into a ditch, so as to throw a sudden lengthwise strain onto the running-gear, the spring K will yield as the upper sections of the wagon-springs N M M are thrown forward with the wagon-bed and the rod guide A, and when the wagon passes the obstruction the spring K will react and draw the wagon bed and springs and their stay-chains back to normal position. The chain J and spring K also provide an elastic connection between the upper and lower parts of the running-gear; hence said chain and spring serve as a yielding brace to the whole running-gear. The bolt-and-nut connections of the stay-chains F H with the bed-blocks G I, respectively, allow lengthwise adjustment of the chain stays to support the rod guide A in vertical position, while the springs N M M are held normally with their upper parts or sections in correct relation with their lower parts.

It will be seen that with our improvement applied to the running-gear of a vehicle, the body-springs will not be allowed to pitch forward or backward so as to set permanently out of shape, consequently the increased durability of the springs and of the wagon-body and of the whole running-gear will be assured.

We show the improvement applied to a running-gear having two springs, M M, at the back end; but it is specially applicable to running-gear wherein both the front and rear springs run laterally or crosswise of the wagon-body like the forward spring, N.

The improvement may be applied to ordinary wagons, buggies, and other vehicles, as will readily be understood.

Having thus described our invention, what we claim as new, and desire to secure by Letters Patent, is—

1. In vehicle running-gear, the combination, with the body-springs, of a guide, A, adapted for attachment to the body and fitted to move vertically therewith, and with the upper sections of the springs, chains, as at F H, connecting the guide A with the upper sections of the springs or with blocks secured thereto, and an elastic stay comprising a chain, J, and spring K, connecting the guide A with the lower part of the running-gear, substantially as and for the purposes herein set forth.

2. The combination, in a vehicle running-gear, of the guide A, fitted to slide in a plate, C, secured to the reach, and provided with a plate, B, adapted for attachment to the vehicle-body, stay-chains F H, connecting the guide A with the upper sections of the springs or with blocks secured thereto, and an elastic stay, comprising a chain, J, and spring K, connecting the guide A with the lower part of the running-gear, substantially as herein set forth.

ROBERT WIEHLE.
WILLIAM LOREY, Jr.
CHRISTIAN FEUCHTER.

Witnesses:
AUGUST HOERNER,
EVAN F. WILLIAMS.